Oct. 10, 1967 N. E. McNERNEY 3,346,690

ALKALI METAL CONDUCTOR TERMINAL

Filed March 10, 1966

NORMAN E. McNERNEY
*INVENTOR.*

BY McLean Morton and Boustead

ATTORNEYS

United States Patent Office 3,346,690
Patented Oct. 10, 1967

3,346,690
ALKALI METAL CONDUCTOR TERMINAL
Norman E. McNerney, Hampden, N.H., assignor to Simplex Wire and Cable Company, Cambridge, Mass., a corporation of Massachusetts
Filed Mar. 10, 1966, Ser. No. 533,335
1 Claim. (Cl. 174—77)

The present invention relates to conductor terminals and in particular to a terminal suitable for use with conductors made of alkali metals, alkaline earth metals and alloys and mixtures thereof.

Conductors made of alkali metals, alkaline earth metals, their alloys and mixtures present termination problems not previously encountered and, therefore, terminals and joining techniques heretofore generally known are not suitable for use with these conductors. Because of the high reactivity of the metals involved, conductors made of them must be protected from the atmosphere, as by enclosure in a tubular sheath in the case of elongated conductors, and the conductor terminal must be adapted to aid in this protection. The low tensile strength of these conductor at the end of the sheath in close proxmify an effective mechanical bond with the terminal and alternate bonding methods must be resorted to.

It is therefore an object of the present invention to provide a terminal for sheathed conductors wherein the conductive metal is an alkali metal, alkaline earth metal, or an alloy or mixture thereof, which terminal incorporates a sealing arrangement whereby the conductor metal is protected from the atmosphere and which terminal is affixed mechanically to the conductor sheath.

This and other objects of the invention are accomplished by providing a terminal for an elongated conductor having a tubular protective sheath in which the terminal is in the form of a plug having a contact portion adapted to penetrate into the reactive metal of the conductor at the end of the sheath in close proximity to the sheath. The contact portion includes circumferential grooving into which the metal of the conductor sheath is deformed and an external compression ring is applied to retain the sheath against this grooved portion of the terminal thereby creating a mechanical bond between them. A shallow, circumferential relief is provided about the periphery of the contact portion of the plug at a position inside of and adjacent the end of the sheath when the plug is fully positioned. This relief is so located and dimensioned that it forms a capillary sealing space between the contact portion of the terminal and the end of the sheath. An effective seal can be created by passing a low melting fusable metallic alloy into this second grooving.

Figure 1:
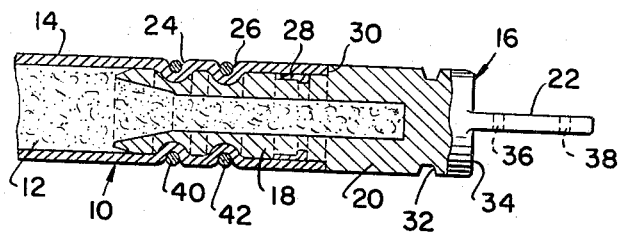
Figure 2:
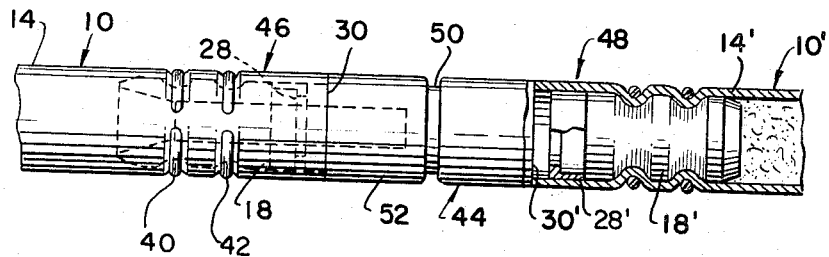

For a further description of the present invention reference is made to the appended drawings, of which:

FIG. 1 is a longitudinal section of a terminal, constructed according to the present invention, positioned in the end of a sheathed conductor; and FIG. 2 is an elevation partially broken away of a splice, constructed according to the present invention, joining two sheathed conductors.

Referring now to FIG. 1, a portion of a sheathed conductor 10 is shown having a central metallic conductor 12 which is completely surrounded by and encased in a tubular sheath 14. Conductor 12 is of an alkali metal, an alkaline earth metal or an alloy or mixture thereof preferably sodium and its alloys and mixtures with potassium, lithium and calcium. Sheath 14 is normally of lead, copper or aluminum but can also be of another metal such as iron. Sheath 14 can also be formed of solid non-conductors, such as polyethylene, which possess the requisite properties to permit effective sealing and mechanical attachment.

A terminal 16 is shown made from an electrically conductive metal, such as copper, and includes a forward contact portion 18, a body portion 20 and a connector portion 22 disposed in that order along its axis. Forward contact portion 18 is somewhat cylindrical and hollow, its forward edge being somewhat pointed to facilitate insertion into the end of the sheathed conductor to function as a plug. The outside diameter of forward contact portion 18 is slightly less than the inside diameter of sheath 14 and its outer surface includes two adjacent circumferential grooves 24 and 26 near its forward edge and a smaller circumferential relief 28 near its other end. Circumferential relief 28 is sized and positioned to form a capillary sealing space between terminal 16 and the end of sheath 14.

Body 20 has a diameter approximately equal to the outside diameter of sheath 14 and cooperates with forward contact portion 18 to define a shoulder against which sheath 14 bears when terminal 16 is fully positioned. Body 20 also includes a circumferential groove 32 which provides a reference for locating grooves 24 and 26 when the latter are hidden by a conductor sheath. Body 20 terminates in a rounded end 34 to which connector portion 22 is attached. Since end 34 is rounded flux concentrations in the terminal are avoided. Connector portion 22 is of conventional configuration and includes a pair of apertures 36, 38 to facilitate proper connection.

A pair of compression rings 40, 42 are provided to conform generally to the contour of grooves 24 and 26. When terminal 16 is inserted into the end of conductor 10 sheath 14 slides over forward contact portion 18 until it abuts shoulder 30. Thereafter using a grooving tool located by reference to annular groove 32 sheath 14 is deformed to conform generally to the contour of grooves 24 and 26 of forward contact portion 18 and rings 40 and 42 are applied over sheath 14 at grooves 24 and 26, respectively, thereby retaining sheath 14 against forward contact portion 18 and creating a mechanical bond between them. In the case of soft sheath, as, for example, polyethylene sheaths, no preliminary deforming is required. A wire of a suitable low melting fusable alloy, such as solder, is then heated to melting and brought in contact with the junction between sheath 14 and terminal 16 whereby circumferential relief 28 is filled by capillary action thereby creating an effective vapor tight seal between sheath 14 and terminal 16. Other sealants can also be used. For example, self-setting silicone fluids which have low viscosity at the ambient temperature can be applied to the joint and fill relief space 28. These then set to a solid state and form a suitable seal.

In FIG. 2 a splice 44 is shown constructed according to the present invention. Essentially, splice 44 of FIG. 2 incorporates a pair of back to back terminals 46 and 48 each similar in construction to terminal 16 of FIG. 1 and joined together at a single locating groove 50. Those portions of splice 44 which are identical to the corresponding portions of terminal 16 are identified by the same reference numerals, $a'$ being used to distinguish portions of terminal 48 from those of terminal 46. It will be seen that the forward contact portions 18, 18' of terminals 46 and 48 are completely identical to contact portion 18 of FIG. 1 and they are inserted into and connected to conductors 10 and 10' in the same manner as that prescribed for forward contact portion 18 in FIG. 1. Terminals 46 and 48 incorporate a single body member 52 which includes groove 50 and which together with forward contact portions 18 and 18' define shoulders 30 and 30' against which sheaths 14 and 14' abut. The connection of splice 44 to conductors 10 and 10' is affected in each instance as described above with reference to the terminal of FIG. 1.

It will be understood that the insertion of terminals according to my invention can incorporate the features described in the co-pending applications of Kenney, for Method of Cable Termination, Ser. No. 520,755, filed Jan. 14, 1966, and of Feick et al., Ser. No. 480,480 filed Aug. 17, 1965, by coating the contact portion of the terminal with a metal such as mercury and by heating the terminal during insertion.

It will be noted with reference to the drawings that the hollow portions of the terminals shown extend beyond their contact portions into the terminal bodies, i.e., beyond the point of maximum penetration into the conductor. These hollow portions of the terminal bodies are filled by metal which is displaced from the conductor as the terminal is inserted into its end. Alternately, a passage through the terminal can be provided through which the displaced metal can escape which passage is then cleaned out and filled with the low melting alloy or other sealant used to form the capillary seal.

What is claimed is:

A terminal for an elongated conductor of an alkali metal, alkaline earth metal or an alloy or mixtures thereof, which conductor is enclosed in a tubular sheath, said terminal being in the form of a plug having a contact portion adapted to fit within an end of the sheath in close proximity thereto and positioned therein, an annular grooving extending about the periphery of said contact portion, external compression means positioned about said sheath to retain said sheath against said annular grooving, means forming a circumferential relief about said contact portion adjacent the end of said sheath proportioned to define a capillary sealing space between said contact portion and said sheath, and sealant filling said space.

No references cited.

LEWIS H. MYERS, *Primary Examiner.*

H. HUBERFELD, *Assistant Examiner.*

UNITED STATES PATENT OFFICE
CERTIFICATE OF CORRECTION

Patent No. 3,346,690　　　　　　　　　　　October 10, 1967

Norman E. McNerney

It is hereby certified that error appears in the above numbered patent requiring correction and that the said Letters Patent should read as corrected below.

Column 1, line 23, after "conductor" strike out "at the end of the sheath in close proximity" and insert instead -- metals, moreover, reduces their ability to form --.

Signed and sealed this 8th day of April 1969.

(SEAL)

Attest:

Edward M. Fletcher, Jr.

Attesting Officer

EDWARD J. BRENNER

Commissioner of Patents